(12) United States Patent
Reynolds et al.

(10) Patent No.: US 10,343,109 B2
(45) Date of Patent: Jul. 9, 2019

(54) SLURRY CONTROL SYSTEM

(71) Applicant: ALSTOM Technology Ltd, Baden (CH)

(72) Inventors: Travis Dwight Reynolds, Knoxville (TN); Dwight Goodman, Knoxville, TN (US); Thomas Edwin Pearson, Knoxvile, TN (US); Dana Humphreys, Harriman, TN (US)

(73) Assignee: General Electric Company, Schenectady, NY (US)

( * ) Notice: Subject to any disclaimer, the term of this patent is extended or adjusted under 35 U.S.C. 154(b) by 54 days.

(21) Appl. No.: 15/224,917

(22) Filed: Aug. 1, 2016

(65) Prior Publication Data

US 2017/0028345 A1 Feb. 2, 2017

Related U.S. Application Data

(62) Division of application No. 13/233,344, filed on Sep. 15, 2011, now Pat. No. 9,429,274.

(60) Provisional application No. 61/426,043, filed on Dec. 22, 2010.

(51) Int. Cl.
| | |
|---|---|
| *B01D 53/30* | (2006.01) |
| *B01D 53/80* | (2006.01) |
| *F17D 1/00* | (2006.01) |
| *B01D 53/50* | (2006.01) |
| *B01D 53/75* | (2006.01) |
| *F23J 15/00* | (2006.01) |

(52) U.S. Cl.
CPC ........... *B01D 53/30* (2013.01); *B01D 53/505* (2013.01); *B01D 53/75* (2013.01); *B01D 53/80* (2013.01); *F17D 1/00* (2013.01); *F23J 15/00* (2013.01); *B01D 2251/404* (2013.01); *B01D 2251/606* (2013.01); *B01D 2257/2042* (2013.01); *B01D 2257/2045* (2013.01); *B01D 2257/2047* (2013.01); *B01D 2257/302* (2013.01); *B01D 2258/0283* (2013.01); *Y10T 137/4891* (2015.04)

(58) Field of Classification Search
CPC ...... B01J 8/00; B01D 53/30; B01D 2251/404; B01D 2257/302; B01D 53/80; B01D 53/505
See application file for complete search history.

(56) References Cited

U.S. PATENT DOCUMENTS

| | | | |
|---|---|---|---|
| 4,040,803 A | 8/1977 | Atsukawa et al. | |
| 4,279,873 A | 7/1981 | Felsvang et al. | |
| 4,322,224 A * | 3/1982 | Roth ................. | B01D 53/30 422/111 |
| 4,452,765 A | 6/1984 | Peterson et al. | |
| 4,487,784 A | 12/1984 | Kuroda et al. | |

(Continued)

*Primary Examiner* — Amber R Orlando
*Assistant Examiner* — Syed T Iqbal
(74) *Attorney, Agent, or Firm* — Frank A. Landgraff

(57) ABSTRACT

A system for regulating an amount of fresh lime slurry introduced to a spray dry absorber. The control system includes a controller configured to receive input from a continuous emissions monitoring system (CEMS), a valve in communication with the controller and a spray dry absorber suction pump, the valve adapted to regulate an amount of fresh lime slurry provided to the spray dry absorber suction pump and a valve in communication with the controller and a pre-mix tank, the valve adapted to regulate an amount of fresh lime slurry provided to the pre-mix tank.

6 Claims, 3 Drawing Sheets

(56) References Cited

U.S. PATENT DOCUMENTS

| | | |
|---|---|---|
| 4,544,542 A | 10/1985 | Angevine et al. |
| 4,595,576 A | 6/1986 | Andreasen et al. |
| 4,623,523 A | 11/1986 | Abrams et al. |
| 4,788,047 A | 11/1988 | Hamala et al. |
| 5,017,349 A | 5/1991 | Davis et al. |
| 5,961,837 A | 10/1999 | Ferrara et al. |
| 6,974,565 B2 | 12/2005 | Pahlman et al. |
| 8,268,276 B2 | 9/2012 | Pearson |
| 2002/0150516 A1 | 10/2002 | Pahlman et al. |
| 2003/0007918 A1* | 1/2003 | Fan ..................... B01D 53/502 423/243.08 |
| 2005/0074380 A1* | 4/2005 | Boren ................... B01J 19/006 423/1 |
| 2006/0121616 A1 | 6/2006 | Lefebvre et al. |

* cited by examiner

SLURRY CONTROL SYSTEM

CROSS REFERENCE TO RELATED APPLICATION

This application claims priority to and is a divisional application of U.S. application Ser. No. 13/233,344 filed on Sep. 15, 2011, entitled "SLURRY CONTROL SYSTEM" which claims the benefit of U.S. Provisional Application Ser. No. 61/426,043, filed Dec. 22, 2010, entitled "SLURRY CONTROL SYSTEM," both of which are incorporated herein by reference in their entireties.

TECHNICAL FIELD

The present disclosure relates to a flue gas desulfurization system and process. More particularly, the present disclosure relates to a method and system of controlling a fresh lime slurry supplied to a flue gas desulfurization system.

BACKGROUND

Combustion of fuel, particularly carbonaceous materials such as fossil fuels and waste, results in flue gas streams that contain impurities, such as mercury (Hg), sulfur oxides ($SO_x$), nitrogen oxides ($NO_x$), and particulates, such as fly ash, which must be removed or reduced to a more acceptable level prior to releasing the flue gas stream to the environment. In response to regulations in place in many jurisdictions, numerous processes and apparatuses have been developed to remove or reduce the levels of impurities and particulates in such flue gas streams.

The typical method of reducing flue gas particulates, Hg, $NO_x$, and $SO_x$ impurities from steam generating boilers powered by fuel combustion is by the use of flue gas stream treatment equipment. Such equipment includes, but is not limited to, electrostatic precipitators (ESP), fabric filter bag houses, catalytic systems, wet flue gas desulfurization (WFGD) systems and/or dry flue gas desulfurization (DFGD) systems.

In some flue gas stream processing systems, removal of acidic components, such as $SO_x$, is facilitated through the use of a DFGD system, wherein a reagent slurry or solution contacts the flue gas stream and reacts with the $SO_x$ present therein. Current DFGD systems typically utilize spray dryer absorbers (SDAs) having an atomizer system that disperses the reagent slurry, typically in combination with a dilution liquid.

Current DFGD systems are slow to respond to $SO_x$ concentration swings in the flue gas stream. Accordingly, what is needed is a system and process that responds to $SO_x$ concentration swings in a timely manner while maintaining the $SO_x$ emission levels from a stack at or below a desired threshold established for the system.

SUMMARY

According to aspects illustrated herein, provided is a recycle system for supplying recycled ash into a dry flue gas desulfurization system, the recycle system comprising: a pre-mix tank configured to receive and combine recycled ash, water and fresh lime slurry to form a slurry; an ash make-up tank configured to receive and combine the slurry from the pre-mix tank with returned slurry from a spray dry absorber; and a feed tank configured to receive a slurry from the ash make-up tank.

According to another aspect illustrated herein, there is provided a system for regulating an amount of fresh lime slurry supplied to an SDA, the control system comprising: a controller configured to receive input from a continuous emissions monitoring system (CEMS); a valve in communication with the controller and an SDA pump suction, the valve adapted to regulate an amount of fresh lime slurry supplied to the SDA pump suction; and a valve in communication with the controller and a pre-mix tank, the valve adapted to regulate an amount of fresh lime slurry supplied to the pre-mix tank.

According to a further aspect illustrated herein, there is provided a method for controlling an amount of fresh lime slurry supplied to an SDA, the method comprising: measuring an $SO_x$ concentration of a flue gas stream in a flue gas processing system; providing the $SO_x$ concentration to a controller; comparing the measured $SO_x$ concentration to an $SO_x$ concentration set point; and regulating an amount of fresh lime slurry supplied to an SDA pump suction based on the comparison of the measured $SO_x$ concentration to the $SO_x$ concentration set point thereby controlling the amount of fresh lime slurry supplied to an SDA system.

The above described systems and methods, and other features are exemplified by the following figures and detailed description.

BRIEF DESCRIPTION OF THE DRAWINGS

Referring to the drawings, wherein like items are numbered alike in the various Figures.

DETAILED DESCRIPTION

Figure 1:
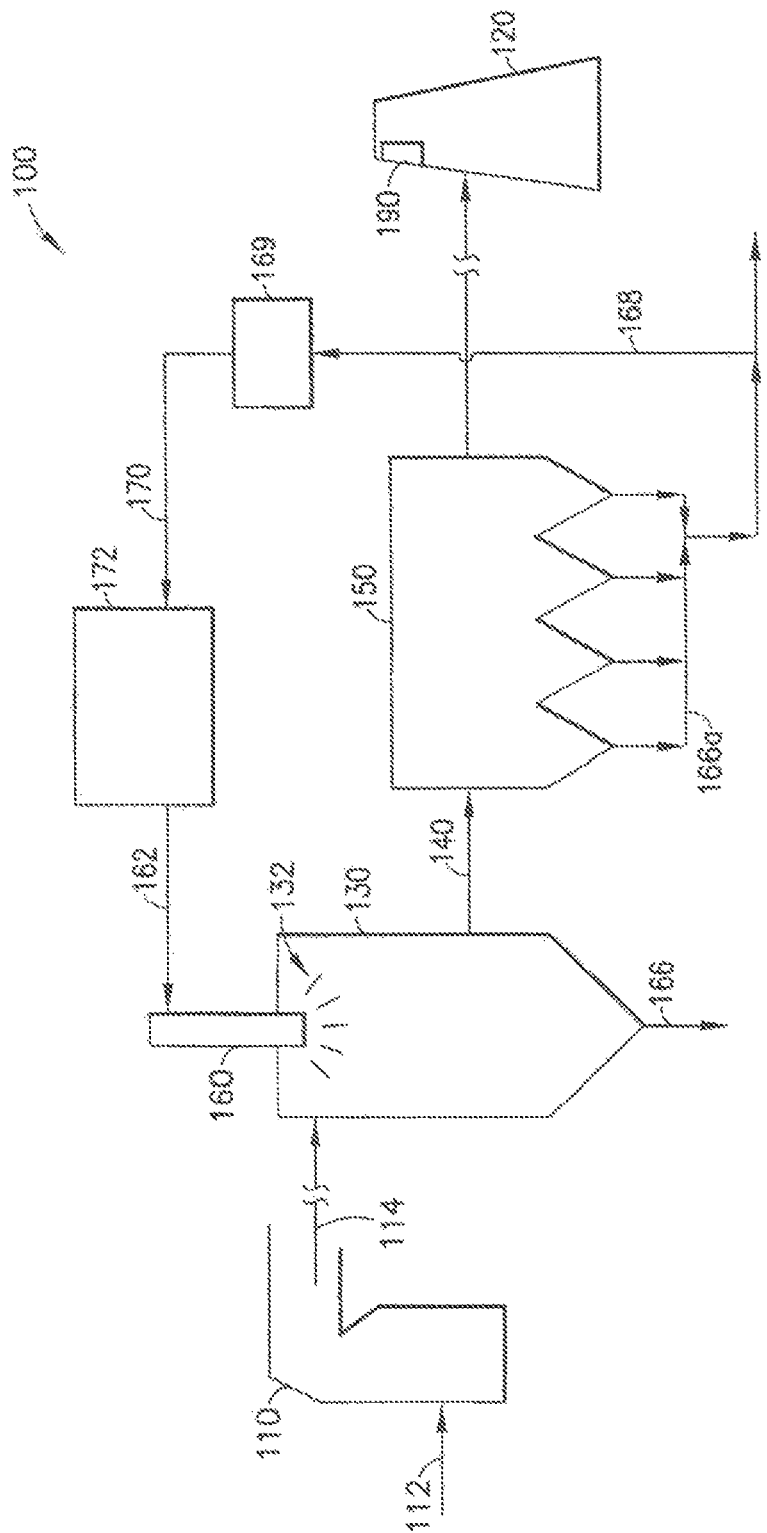
FIG. 1 depicts a schematic overview of a flue gas processing system having a dry flue gas desulfurization (DFGD) system.

FIG. 1 illustrates a flue gas stream processing system 100, which includes a combustion chamber 110 that combusts a fuel 112, such as coal, to produce a flue gas stream 114. Flue gas stream 114 may contain contaminants, including, but not limited to particulates, sulfur oxides ($SO_x$), nitrogen oxides ($NO_x$), mercury, carbon dioxide ($CO_2$), and the like. Prior to being released to an environment via a stack 120 or other ventilation arrangement, the flue gas stream 114 typically undergoes processing to remove or reduce the amount of contaminants present therein.

In one embodiment, as illustrated in FIG. 1, the flue gas stream 114 proceeds to a spray dry absorber (SDA) 130. While not shown in FIG. 1, it is contemplated that the flue gas stream 114 may proceed through one or more devices, such as, for example, an air pre-heater, prior to being introduced to the SDA 130.

In the SDA 130, the flue gas stream 114 interacts with a reagent that facilitates the removal of acidic components, such as $SO_x$, hydrogen chloride (HCl), hydrogen fluoride (HF), and hydrogen bromide (HBr), from the flue gas stream to create flue gas stream 140 containing a reduced level of acid gases. As illustrated in FIG. 1, the reduced acid gas level flue gas stream 140 that contains a reduced level of acid gases is provided to a particulate remover 150 prior to release to an environment via stack 120. The particulate remover 150 may be a bag house, an electrostatic precipitator (ESP), a mechanical dust collector, or the like. The flue gas stream processing system 100 is not limited by the process described in the present embodiment since it is contemplated that reduced acid gas level flue gas stream 140 may pass through other flue gas processing devices, including, but not limited to, $NO_x$ removal devices, cooling towers, air pre-heaters, and the like.

Removal of acidic components from the flue gas stream 114 is often undertaken to maintain compliance with emission regulations. In one embodiment, acidic components present in the flue gas stream 114 are removed by exposing the flue gas stream to the SDA 130 where it contacts an atomized reagent 132 generated by an atomizer system 160. The reagent slurry 162 may be, for example, a slurry containing lime. The atomized reagent 132 facilitates the absorption of the acidic components present in the flue gas stream 114.

The atomized reagent 132 absorbs contaminants, e.g., $SO_x$, from the flue gas stream 114 to produce the reduced acid gas level flue gas stream 140, which contains a reduced level of acid gases and used reagent 166. The used reagent 166 is collected at the bottom of the SDA 130 and supplied to other components for further processing or discarded from the system completely. Particulate matter 166a is collected by the particulate collector 150. At least a portion of the particulate matter 166a is sent as regenerable particulate matter 168 to a regeneration system 169.

As further depicted in FIG. 1, it is contemplated that at least a portion of the regenerable particulate matter 168 is diverted away from the regeneration system 169 and sent to another system or disposed of completely. The system 100 is not limited in this regard as it is contemplated that all of the regenerable particulate matter 168 may be sent to the regeneration system 169. Additionally, it is contemplated that system 100 may be configured to combine at least a portion of the used reagent 166 with the particulate matter 166a to form the regenerable particulate matter 168.

The regenerable particulate matter 168 is regenerated to form recycled ash 170, which may be supplied to a recycle system 172 for utilization, in the system 100. The recycled ash 170 facilitates removal of acid gases, e.g., $SO_x$, from the flue gas stream 114.

Figure 2A:
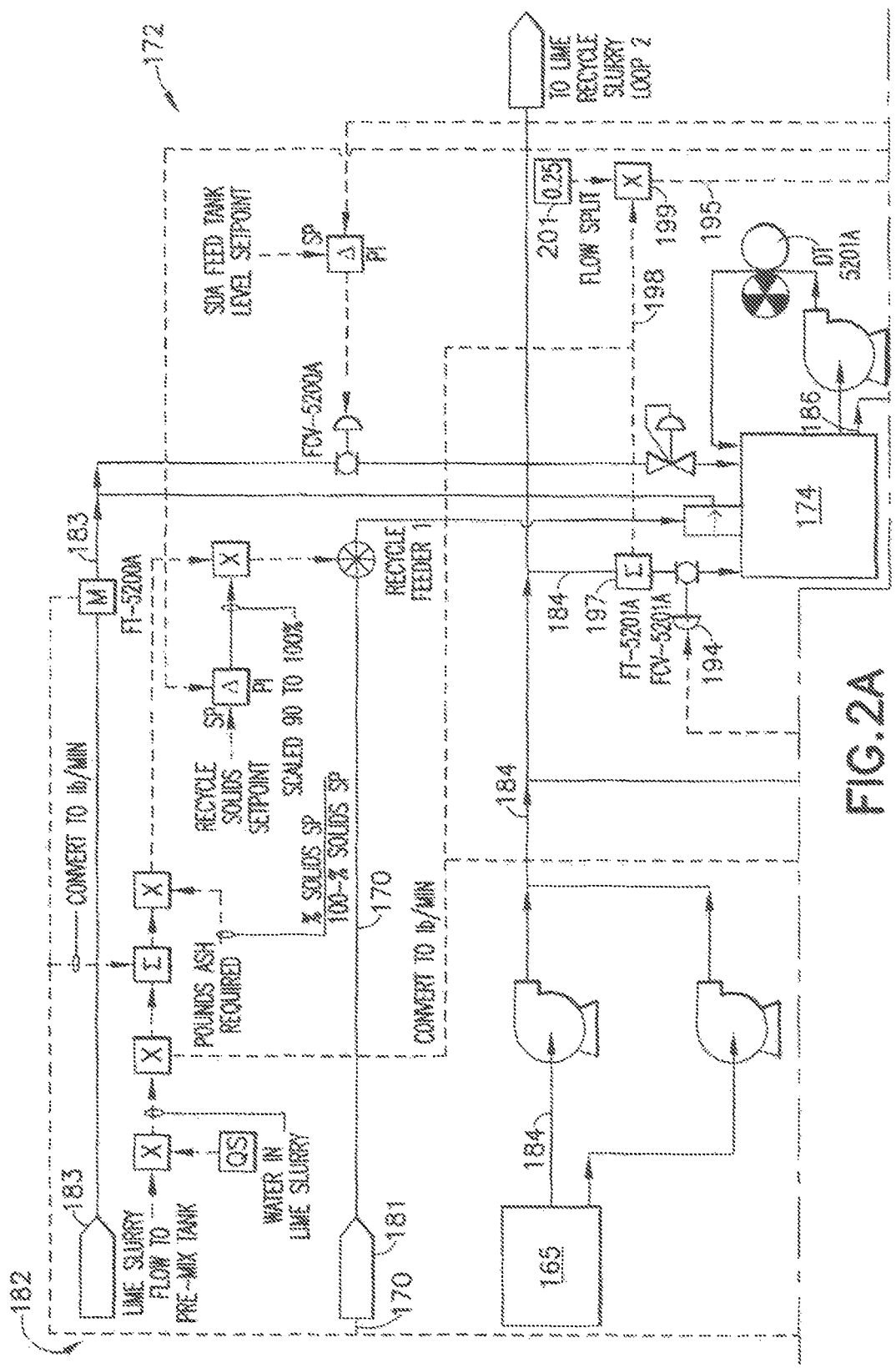
FIG. 2A depicts a schematic first portion of a recycle system directed to a premix tank used in connection with a DFGD system.
Figure 2B:
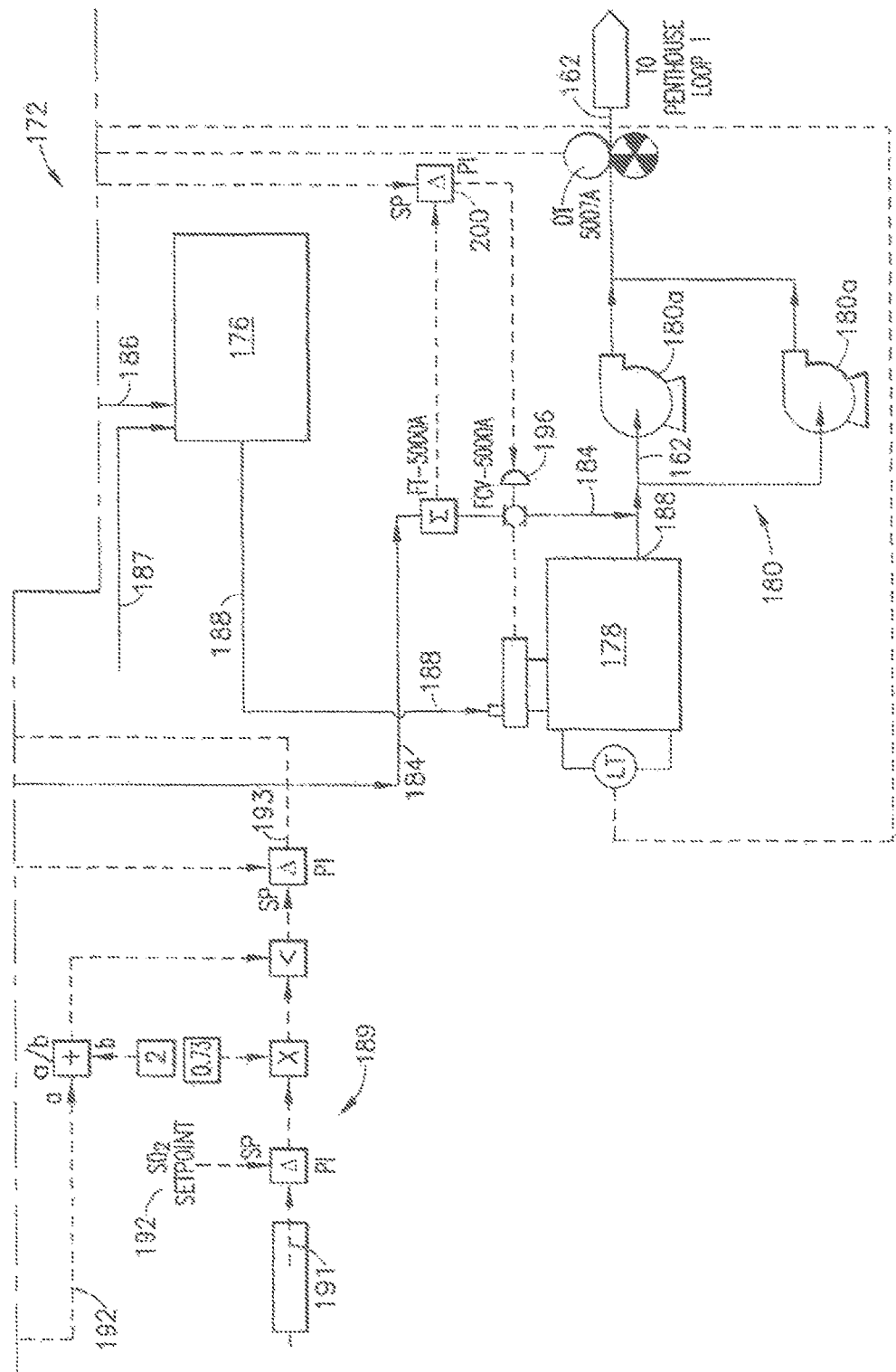
FIG. 2B depicts a schematic second portion of the recycle system directed to an ash makeup tank and feed tank used in connection with the DFGD system.

As illustrated in FIGS. 2A and 2B, the recycle system 172 includes a pre-mix tank 174, an optional ash make-up tank 176 and a feed tank 178. The recycle system 172 includes an SDA pump suction 180, which is in fluid communication with the SDA 130 (shown on FIG. 1). The SDA pump suction 180 may include, for example, one or more pumps 180a, which facilitates pumping slurry from the feed tank 178 to the SDA 130.

The recycle system 172 is configured for recycled ash 170 supply into the DFGD of the flue gas processing system 100 via, for example, the SDA 130. As illustrated in FIG. 2A, the recycled ash 170 is supplied to a recycle silo 171 prior to supply to the pre-mix tank 174. The amount of recycled ash 170 supplied to the pre-mix tank 174 is determined by a control system 182. The amount of recycled ash 170 and water 183 supplied to the pre-mix tank 174 is dependent on several factors, including, but not limited to, for example, the fuel 112 of the system 100, the concentration of the $SO_x$ in the flue gas stream exiting the stack 120, the overall application in which the system 100 is employed, and the like.

The pre-mix tank 174 is configured to receive, via fluidly connected ducts, tubes, chutes, piping, and the like, water 183, recycled ash 170, and fresh lime slurry 184. The water 183, recycled ash 170 and fresh lime slurry 184 are combined in the pre-mix tank 174 to form a slurry 186, which is supplied to the ash make-up tank 176. The ash make-up tank 176 is configured to receive, via fluidly connected ducts, tubes, chutes, piping, and the like, the slurry 186 and combine the slurry 186 with returned slurry 187 from the SDA 130. In the absence of the make-up tank 176, returned slurry 187 is directed to the pre-mix tank 174 (not shown). The returned slurry 187 is a portion of the reagent slurry 162 provided to the SDA 130 and not atomized by the atomizer system 160. The returned slurry 187 has a large amount of energy, which is utilized by the ash make-up tank 176 (or the pre-mix tank 174) to agitate and thereby combine the returned slurry 187 with the slurry 186 to form a slurry 188 that is supplied to the feed tank 178.

The energy of mixing required to mix solid product with lime and water is significant. Due to the elevation change that the returned slurry 187 is subject to during the descent from the atomizers in the SDA 130 to the recycle system 172 at grade, there is a substantial amount of energy present. By adding the returned slurry 187 into the ash make-up tank 176, that energy is used to increase the mixing efficiency inside the ash make-up tank (or pre-mix tank 174 if the ash make-up tank 176 is not present). This in turn reduces the total parasitic power consumption on the recycle system, and allows agitator motor size reduction on the tank where the return is directed.

The feed tank 178 is configured to receive, via fluidly connected ducts, tubes, chutes, piping, and the like, the slurry 188 from the ash make-up tank 176 (or pre-mix tank 174). The slurry 188 is pumped out of the feed tank 178 by the pump in the SDA pump suction 180 and combined with the fresh lime slurry 184 in the SDA pump suction to form the reagent slurry 162, which is supplied to the SDA 130. As illustrated in FIG. 2B, the fresh lime slurry 184 is supplied from the slurry storage tank 185 to the SDA pump suction 180.

The recycle system 172 may also include a controller 189. As shown in FIG. 2B, the controller 189 is in communication with at least the SDA pump suction 180 and the pre-mix tank 174. The controller 189 is a device or set of devices capable of managing, commanding, directing or regulating the actions of other devices or systems. Examples of controller 189 include, but are not limited to, manual control devices, programmable logic control, feedback systems, and the like.

In one embodiment, the controller 189 is configured to regulate an amount of fresh lime slurry 184 supplied to the SDA 130. For example, the amount of fresh lime slurry supplied to the pre-mix tank 174 and/or SDA pump suction 180 may be increased or decreased based on the concentration of $SO_x$ detected in the flue gas stream 114, 140 of the system 100.

The concentration of $SO_x$ detected in the flue gas stream 114, 140 may be measured by a continuous emissions monitoring system (CEMS) 190 (shown in FIG. 1). As shown in FIG. 1, the CEMS 190 may be placed in communication with the stack 120 to measure the concentration of $SO_x$ in the flue gas stream 140 leaving the system 100 through the stack.

After measuring a $SO_x$ concentration, the CEMS 190 supplies that information via a signal 191 to the controller 189. The $SO_x$ concentration measured by the CEMS 190 is compared to a $SO_x$ concentration setpoint 192, which is entered or programmed into the controller 189. The amount of fresh lime slurry 184 supplied to the pre-mix tank 174 is regulated (e.g., increased, decreased, or maintained at a particular amount), based on the comparison of the measured $SO_x$ concentration to the $SO_x$ concentration setpoint 192.

For example, if the measured $SO_x$ concentration is greater than the $SO_x$ concentration setpoint 192, the controller 189 sends a signal 193 to a valve 194 to increase the amount of fresh lime slurry 184 supplied to the pre-mix tank 174 by partially or fully opening the valve 194. "Increase" as used herein includes supplying more fresh lime slurry 184 than what is already supplied as well as starting to supply fresh lime slurry when none has been supplied.

By increasing an amount of fresh lime slurry 184 supplied to the pre-mix tank 174, the amount of $SO_x$ absorbed in the SDA 130 increases, thereby decreasing the concentration of $SO_x$ present in the flue gas stream 140 emitted through the stack 120.

In another example, if the measured $SO_x$ concentration is less than the $SO_x$ concentration setpoint 192, the amount of fresh lime slurry 184 supplied to the pre-mix tank 174 may be regulated in at least two (2) ways: the amount of fresh lime slurry 184 supplied to the pre-mix tank 174 may be decreased, or the amount of the fresh lime slurry 184 supplied to the pre-mix tank 174 may be maintained, i.e., not increased or decreased. "Decreased" as used herein includes supplying less fresh lime slurry 184 than what is already provided as well as supplying no fresh lime slurry.

The manner in which the fresh lime slurry 184 is regulated when the measured $SO_x$ concentration is less than the $SO_x$ concentration setpoint 192 will vary from application to application and may be a decision left to the user of the system 100.

If the amount of fresh lime slurry 184 supplied to the pre-mix tank 174 is decreased, the controller 189 sends a signal 193 to a valve 194. The valve 194 is then partially or fully closed in response to the signal 193. By decreasing an amount of fresh lime slurry 184 supplied to the pre-mix tank 174, the system 100 will reduce the amount of fresh lime slurry 184 used to absorb $SO_x$, but maintain the established/required emission concentration of $SO_x$.

If the amount of fresh lime slurry 184 supplied to the pre-mix tank 174 is to be maintained, the signal 193 to valve 194 is maintained.

In another embodiment, the controller 189 is configured to regulate an amount of fresh lime slurry 184 supplied to the spray dry absorber (SDA) pump suction 180. The amount of fresh lime slurry 184 supplied to the SDA pump suction 180 is regulated by sending a signal 195 to a controller 200, which partially or fully opens or closes a valve 196 depending on the signal. As illustrated in FIG. 2A, a flow transmitter 197 measures the amount of fresh lime slurry 184 supplied to the pre-mix tank 174 and sends a signal 198 to a ratio calculator 199 to produce signal 195. Signal 195 is the input to controller 200, which modulates the valve 196.

Increasing an amount of the fresh lime slurry 184 at the SDA pump suction 180 facilitates a rapid response time to increase absorption of SOx in the SDA 130. A fast response time may be beneficial in situations where there is a wide swing (i.e., variance) of SOx concentration in the flue gas stream 114.

The amount of fresh lime slurry 184 supplied to the SDA pump suction 180 is dependent upon the amount of fresh lime slurry 184 supplied to the pre-mix tank 174. In one embodiment, the amount of fresh lime slurry 184 supplied to the SDA pump suction 180 is proportionately increased or decreased based on the amount of fresh lime slurry 184 supplied to the pre-mix tank 174. For example, if the amount of fresh lime slurry 184 supplied to the pre-mix tank 174 is increased by 25%, the amount of fresh lime slurry 184 supplied to the SDA pump suction 180 is also increased by 25%. Likewise, if the amount of fresh lime slurry 184 supplied to the pre-mix tank 174 is decreased by 25%, then the amount of fresh lime slurry 184 supplied to the SDA pump suction 180 is also decreased by 25%. Similarly, if the amount of fresh lime slurry 184 supplied to the pre-mix tank 174 is maintained (i.e., not increased or decreased) then the amount of fresh lime slurry 184 supplied to the SDA pump suction 180 is also maintained.

By regulating the amount of the fresh lime slurry 184 supplied to the pre-mix tank 174, the amount of fresh lime slurry 184 supplied to the SDA suction pump 180 may be reduced or stopped completely.

Valve 194 is modulated based on lime slurry flow demand signal 193 which is in communication with the signal 198. This control logic allows for fresh lime slurry 184 to the pre-mix tank 174 and SDA pump suction 180 such that lime slurry ratio calculator 199 maintains the flow split as determined by a setpoint 201.

The feedback and control (e.g. signals 193, 195, 198, and valves 194 and 196, the controller 189, 200, etc.) in the recycle system 172 facilitates quick responses to swings in the $SO_x$ concentration in the SDA 130, and also facilitates sustained control of the fresh lime slurry 184 supplied to the SDA by proportionately controlling an amount of fresh lime slurry 184 supplied to the pre-mix tank 174 and then proportionately adjusting the fresh lime slurry 184 supplied to the SDA pump suction 180. That is, the fresh lime slurry 184 supplied to the SDA pump suction 180 may be used for the rapid response while allowing the amount of fresh lime slurry 184 supplied to the pre-mix tank 174 for ramping up or ramping down to maintain fresh lime inventory in the recycle system 172.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling an amount of fresh lime slurry supplied to a spray dryer absorber, the method comprising:
    measuring an $SO_x$ concentration of a flue gas stream using an emissions monitoring system arranged in a stack downstream of a particulate remover in a flue gas processing system to obtain a measured $SO_x$ concentration;
    supplying the measured $SO_x$ concentration from the emissions monitoring system to a controller;
    comparing via the controller the measured $SO_x$ concentration to an $SO_x$ concentration set point;
    regulating an amount of a fresh lime slurry, an amount of water and an amount of recycled ash supplied to a pre-mix tank for mixing to obtain a slurry, based on the comparison of the measured $SO_x$ concentration to the $SO_x$ concentration set point to control the amount of the fresh lime slurry supplied to the spray dryer absorber;

supplying the slurry from the pre-mix tank and a returned non-atomized reagent slurry from the spray dryer absorber to an ash makeup tank for mixing to obtain a feed slurry;

supplying the feed slurry from the ash makeup tank to a feed tank; and supplying a reagent slurry obtained from a combination of the feed slurry from the feed tank and fresh lime slurry, to the spray dryer absorber.

2. A method according to claim 1, wherein regulating the amount of fresh lime slurry supplied to the pre-mix tank includes increasing the amount of fresh lime slurry supplied to the pre-mix tank if the measured $SO_x$ concentration is greater than the $SO_x$ concentration set point.

3. A method according to claim 1, wherein regulating the amount of fresh lime slurry supplied to the pre-mix tank includes decreasing the amount of fresh lime slurry supplied to the pre-mix tank if the measured $SO_x$ concentration is less than the $SO_x$ concentration set point.

4. A method according to claim 1, wherein regulating the amount of fresh lime slurry supplied to the pre-mix tank includes maintaining constant the amount of fresh lime slurry supplied to the pre-mix tank if the measured $SO_x$ concentration is less than the $SO_x$ concentration set point.

5. A method according to claim 1, wherein regulating the amount of fresh lime slurry supplied to the pre-mix tank includes maintaining constant the amount of fresh lime slurry supplied to the pre-mix tank if the measured $SO_x$ concentration is substantially similar to the $SO_x$ concentration set point.

6. A method according to claim 1 further comprising:
regulating an amount of fresh lime slurry supplied to a spray dryer absorber pump to proportionately increase or decrease the amount of fresh lime slurry supplied to the spray dryer absorber pump based on the amount of fresh lime slurry supplied to the pre-mix tank.

* * * * *